United States Patent [19]
Kim

[11] Patent Number: 5,679,121
[45] Date of Patent: Oct. 21, 1997

[54] AIR FILTER ATTACHMENT APPARATUS OF AIR CONDITIONER

[75] Inventor: Do-Yeon Kim, Incheon, Rep. of Korea

[73] Assignee: Samsung Electronics Co., Ltd., Suwon, Rep. of Korea

[21] Appl. No.: 570,512

[22] Filed: Dec. 11, 1995

[30] Foreign Application Priority Data

Dec. 10, 1994 [KR] Rep. of Korea ............ 94-33571 U
Dec. 10, 1994 [KR] Rep. of Korea ............ 94-33572 U

[51] Int. Cl.$^6$ ........................................ B01D 35/30
[52] U.S. Cl. ................. 55/481; 55/493; 55/506; 55/DIG. 6
[58] Field of Search ............... 55/481, 490, 493, 55/506, DIG. 6

[56] References Cited

U.S. PATENT DOCUMENTS

| | | | |
|---|---|---|---|
| 1,850,101 | 3/1932 | Greene | 55/493 |
| 2,540,725 | 2/1951 | Geldhof | 55/506 |
| 2,575,499 | 11/1951 | Manow | 55/493 |
| 3,513,634 | 5/1970 | Angonese et al. | 55/493 |
| 3,626,668 | 12/1971 | Cardiff | 55/493 |
| 4,743,281 | 5/1988 | Kennedy et al. | 55/493 |
| 4,978,375 | 12/1990 | Il Yoo | 55/493 |
| 5,176,570 | 1/1993 | Liedl | 55/481 |
| 5,192,347 | 3/1993 | Lee | 55/481 |
| 5,203,893 | 4/1993 | Horii | 55/493 |

*Primary Examiner*—C. Scott Bushey
*Attorney, Agent, or Firm*—Burns, Doane, Swecker & Mathis, L.L.P.

[57] ABSTRACT

An air conditioner includes a body and a filter-carrying apparatus mounted to the body for carrying a removable filter. The filter-carrying apparatus includes a grill mounted to the body for rotation about a horizontal axis adjacent its lower end between a closed position adjacent the body and an open position spaced from the body. A filter guide structure guides a filter for sliding movement relative to the grill along a guide path. The filter guide structure is operably connected to the grill for movement therewith away from the body when the grill is moved to its open position. The guide path defined by the filter guide structure is oriented at an angle relative to a plane of the grill when the grill is in its open position. The filter guide structure can be rigidly connected to the grill to form a permanently angled relationship therebetween, or it can be pivotally mounted for movement relative to the grill so that the angled relationship is formed only when the grill is rotated to its open position.

8 Claims, 6 Drawing Sheets

AIR FILTER ATTACHMENT APPARATUS OF AIR CONDITIONER

BACKGROUND OF THE INVENTION

1. Field of the Invention

The present invention relates to an air filter attachment apparatus of an air conditioner, and more particularly to an air filter attachment apparatus of an air conditioner by which an air filter can be easily dismantled for cleaning.

2. Description of the Prior Art

FIGS. 1 and 2 show an air filter attachment apparatus of an air conditioner according to the prior art, wherein the air filter attachment apparatus includes a suction grill 20 hingedly coupled at a lower side thereof to a lower end of a front suction inlet 11 by means of a hinge pin 12 so as to cover the front suction inlet 11 of a body 10 of the air conditioner and to allow suction air to pass therethrough. A connecting chain 30 is provided for mutually connecting the front suction inlet 11 and the suction grill 20 to limit rotation of the latter when opened and closed. An air filter 40 is provided for filtering the dust floating through a suction hole 21 of the suction grill. First and second filter guiding members 50 and 51 are fixedly coupled to both side edges of the suction grill 20 so that the air filter 40 can be drawn in and drawn out through a rear side of the suction grill 20.

Now, the suction grill 20 thus explained will be described in detail.

As illustrated in FIG. 1, the suction grill 20 is formed with a plurality of suction holes 21 spaced at a predetermined vertical interval so that room air can be infused into the body 10 of the air conditioner (see FIG. 2), and both side edges thereof are bent to form respective flange units 22.

Furthermore, the suction grill 20 is formed at a rear lower area thereof with a pad piece 23 for supporting a lower area of the air filter 40.

The suction grill 20 is also formed with plates 24 extending next to respective flange units 22, so that the air filter 40 can be prevented from being swayed to the left and to right side edges.

The suction grill 20 is opened at an upper end thereof so that the air filter 40 can be smoothly drawn in and out from a top side of the suction grill 40.

Meanwhile, the first and the second filter guiding members 50 and 51 each includes a pair of end portions 52, 53 arranged in offset relationship to form a step 54.

Each end portion 52 is fixed to a flange 23 and a plate 24, and the other end portion 53 extends perpendicularly to an inner side of the protruding piece 24 and maintains a predetermined spacing from a rear surface of the suction grill 20.

As described in the foregoing, according to the air filter attachment apparatus of an air conditioner, the air filter 40 is so designed as to be inserted through a gap formed between the rear surface of the suction grill 20 and the end portions 53, so that, as illustrated in FIG. 2, the air filter 40 should be in parallel with the suction grill 20 to thereby cover the rear surface of the suction grill 20.

However, there is a problem in that, although the air filter 40 can throughly filter the dust floating in the air sucked in through the suction holes 21 formed in the suction grill 20, when the upper side of the suction grill 20 is blocked (by way of example, when an accommodation unit of a remote controller or other apparatuses is attached) it becomes inconvenient to draw in or draw out the air filter 40.

There is another problem in that difficulty is involved for accurately measuring the size of the air filter 40 and no expectation can be obtained for accurate attachment of the air filter 40.

SUMMARY OF THE INVENTION

Accordingly, the present invention has been disclosed to solve the aforementioned problems and it is an object of the present invention to provide an air filter attachment apparatus of an air conditioner by which an air filter covers a rear surface of a suction grill to thereby filter the dust floating in the air.

It is another object of the present invention to provide an air filter attachment apparatus of an air conditioner by which the air filter can be automatically attached and released from a suction grill at a predetermined angle through the medium of a filter guide member when the suction grill is opened.

In accordance with one aspect of the present invention, there is provided an air filter attachment apparatus of an air conditioner, the air filter attachment comprising:

a pair of first and second grill brackets for being fixedly coupled to both ends at a rear side of a suction grill; and a filter guide member employing a pair of first and second guide rails and first and second connecting pieces respectively connected to lower and upper ends of the first and second guide rails for facilitating to draw in and draw out the air filter.

In accordance with another aspect of the present invention, there is provided an air filter attachment of an air conditioner, the air filter attachment comprising:

first and second grill brackets employing a horizonal portion and a vertical portion;

a fixed portion fixedly coupled to an inner surface of the vertical portion of the first and second grill brackets;

first and second flange portions formed at right angle with both side of the fixed portion; and first and second filter guide members having a slantly-formed inclination portion in order to facilitate to draw in and draw out the air filter.

BRIEF DESCRIPTION OF THE DRAWINGS

For a better understanding of the nature and objects of the invention, reference should be made to the following detailed description taken in conjunction with the accompanying drawings in which.

DETAILED DESCRIPTION OF PREFERRED EMBODIMENT OF THE INVENTION

Embodiments of the present invention will now be described in detail according to the accompanying drawings.

Figure 1:
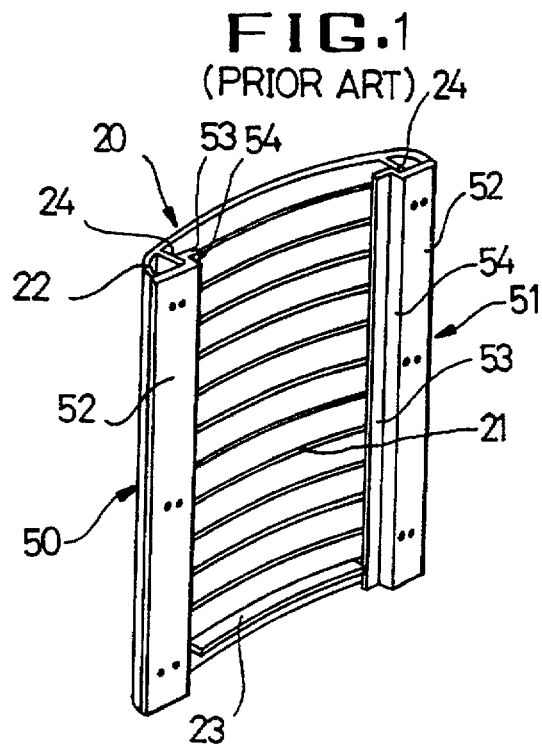
FIG. 1 is a perspective view for illustrating a filter guide member and a suction grill according to the prior art.
Figure 2:
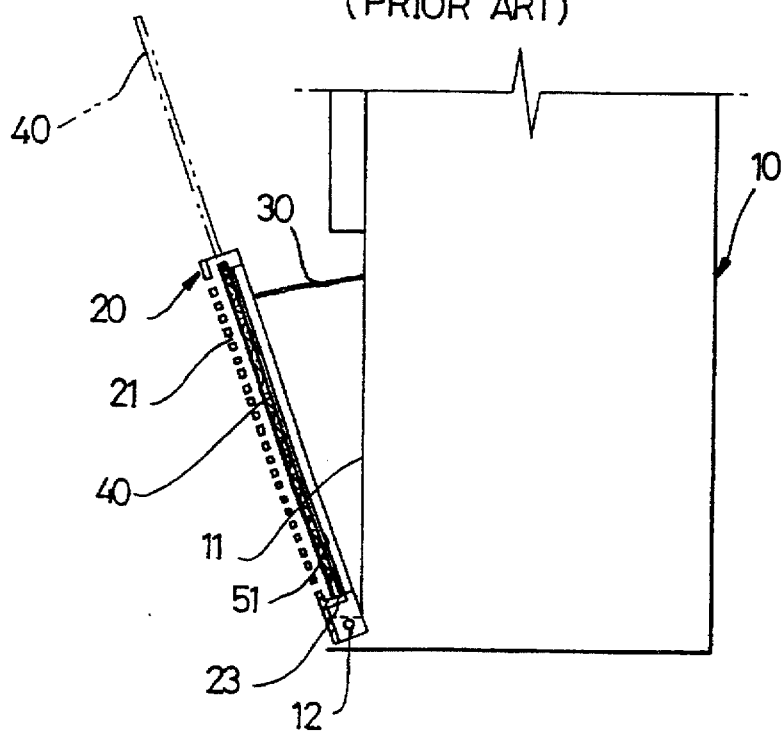
FIG. 2 is a side sectional view for illustrating how the air filter is drawn out of the structure depicted in FIG. 1.
Figure 3:
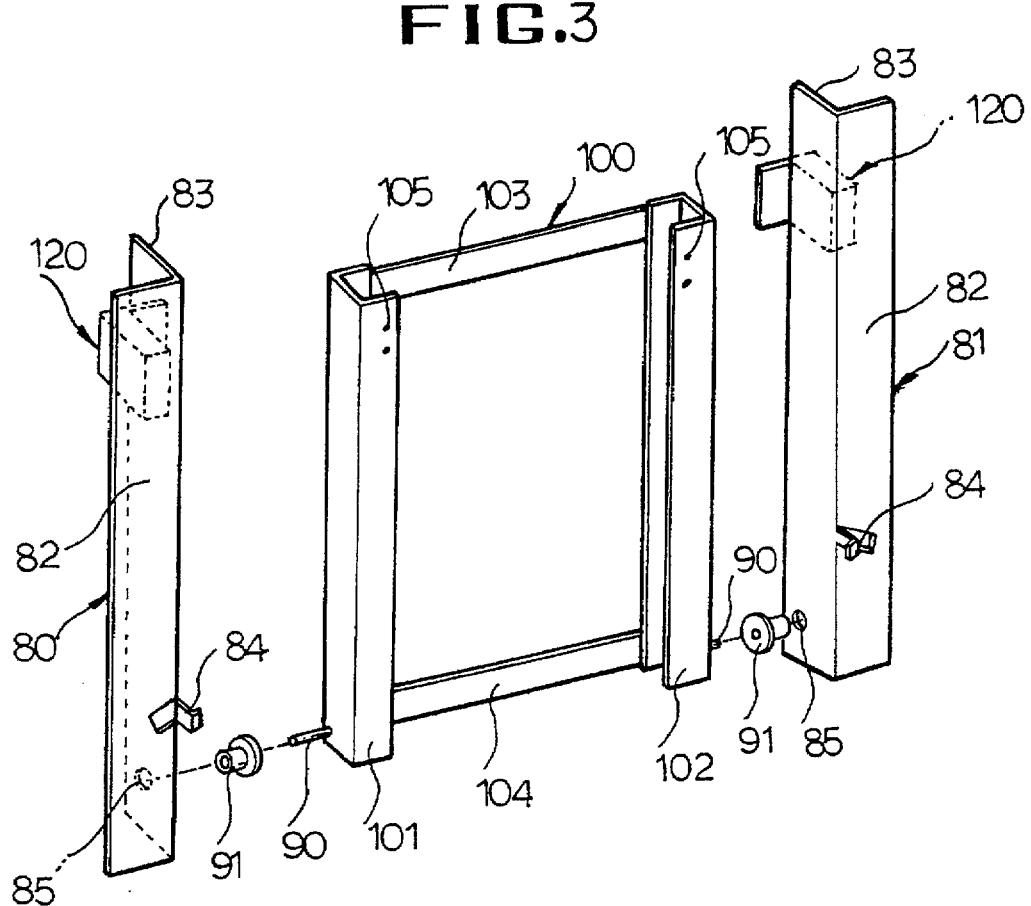
FIG. 3 is an exploded perspective view for illustrating an air filter attachment apparatus of an air conditioner according to a first embodiment of the present invention.
Figure 4:
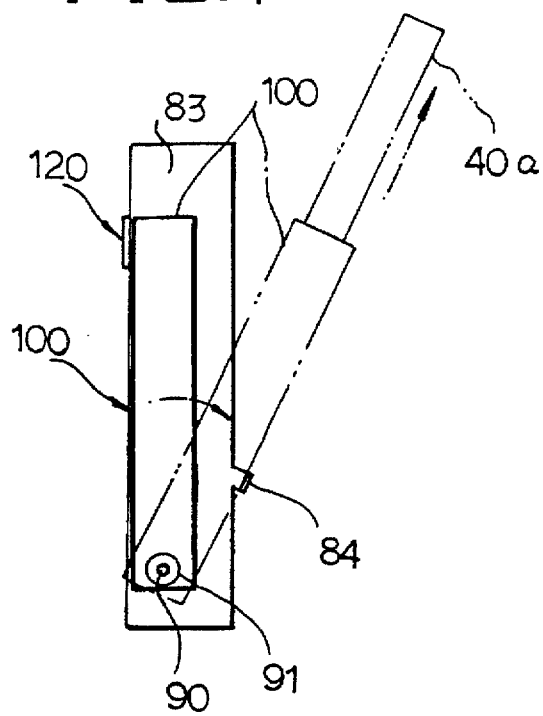
FIG. 4 is a side view for illustrating an air filter attachment apparatus according to the first embodiment.

Principal parts of an air filter according to the present invention, as illustrated in FIG. 3, include a pair of first and second grill brackets 80 and 81 for being fixedly coupled to side edges of the suction grill 20 depicted in FIG. 1; and a filter guide member 100 employing a pair of first and second C-shaped guide rails 101 and 102 and first and second connecting pieces 103 and 104 respectively connected to lower and upper ends of the first and second guide rails 101 and 102 for facilitating entry and removal of the air filter.

The first and second grill brackets 80 and 81 each include first and second portions 82, 83 arranged in L-shaped when viewed from a top thereof. The portion 82 thereof is fixedly coupled to rear both ends of the suction grill 20 (see FIG. 5 and 5A). For further reference, it should be noted that the horizontal portion 82 is fixedly coupled between the flange portion 22 and the protruding piece 24.

The portion 83 of the first and second grill brackets 80 and 81 engages an inner surface of the respective protruding piece 24.

The first portion 82 and the second portion 83 intersect at a corner provided with a stopper 84.

The second portion 83 is provided at an upper end thereof with an L-shaped magnet 120 so that the filter guide member 100 can be attracted to the magnet by way of magnetic force.

The second portion 83 is provided at a lower end thereof with a shaft hole 85 so that a hinge axle 90 (described later) can be inserted thereinto.

The hinge axle 90 is welded at one end thereof to a lower end of the first and second guide rails 101 and 102 of the filter guide member 100, and is coupled at the other end thereof to the shaft hole 85.

Furthermore, the first and second guide rails 101 and 102 are in mutually facing horizontally spaced relationship when viewed from the top thereof so that the air filter 40 can be drawn in and drawn out vertically with respect thereto.

Figure 5:
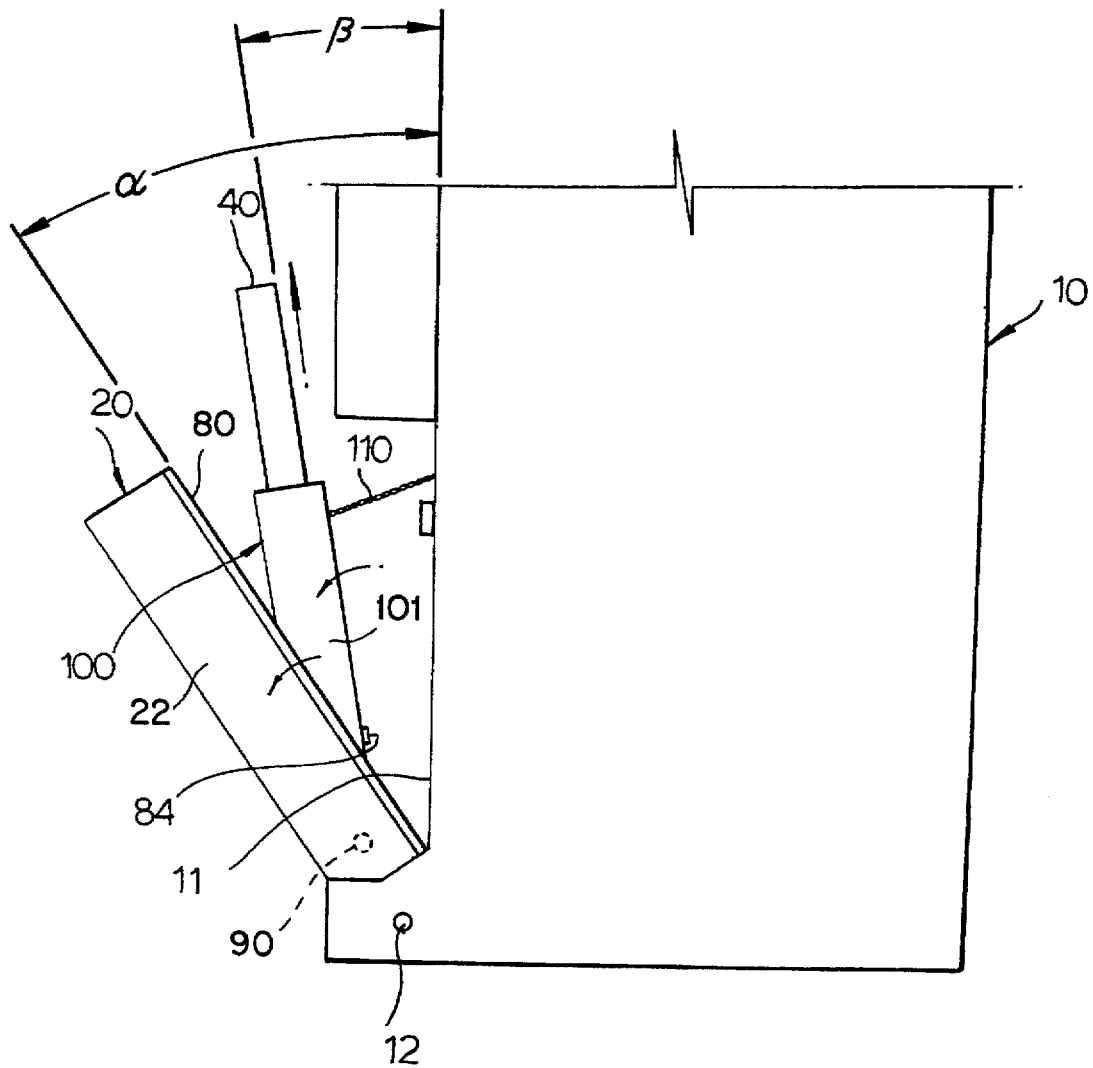
FIG. 5 illustrates an air conditioner containing an air filter attachment apparatus according to the first embodiment of the present invention.
Figure 5A:
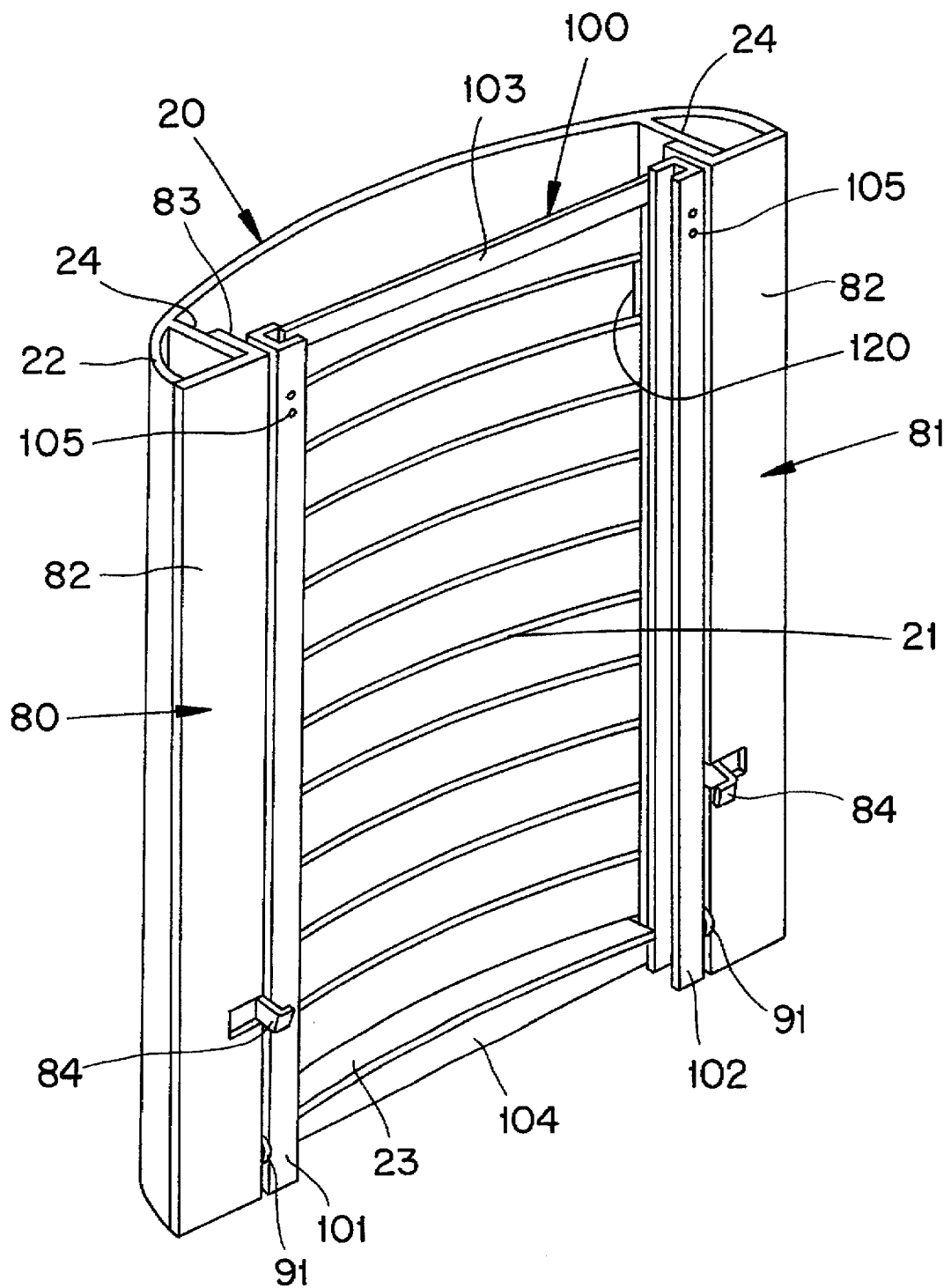
FIG. 5A is a front perspective view of the air filter attachment apparatus depicted in FIG. 5.

The first and second guide rails 101 and 102 are provided at upper ends thereof with a plurality of connecting holes 105 for installing connecting chains 110 thereinto (see FIG. 5).

In summary, the air filter attachment apparatus according to one embodiment of the present invention, as illustrated in FIGS. 3, 4, 5 and 5A, includes suction grill 20 for being hingedly coupled to a lower end of a body 10 of the air conditioner through the medium of hinge pin 12 so that a suction inlet 11 of the body 10 can be covered at a front surface thereof and at the same time, air can pass therethrough. An air filter 40 is provided for filtering the dust floating in the air when passing through the suction grill 20. First and second suction grill brackets 80 and 81 are fixedly coupled to respective side edges of the suction grill 20. The filter guide member 100 is coupled through the medium of hinge axle 90 to the first and second grill brackets 80 and 81 to thereby allow the air filter 40 to be drawn in and drawn out through an upper side of the suction grill 20. The connecting chain 110 connects the suction inlet 11 and the filter guide member 100 so that the filter guide member 100 can be rotated (clockwise in FIG. 5) to a predetermined inclination relative to the suction grill 20 about the axle 90 when the suction grill is rotated open about the axle 12. The magnet 120 disposed on each of the first and second grill brackets 80 and 81 holds the filter guide member 100 parallel to a rear side of the suction grill.

Now, the operation of the air filter attachment apparatus according to the embodiment of the present invention thus described will be described.

When the suction grill 20 is pulled out to an open state as illustrated in FIG. 5 in order to clean the air filter 40, the suction grill 20 is also rotated to thereby also rotate the air filter 40.

In other words, when the suction grill 20 is rotated open, the first and second grill brackets 80 and 81 fixedly coupled to rear ends of the suction grill 20 are rotated due to their attraction to magnets 120.

When the suction grill 20 and the filter guide member 100 reach an inclination β, the chain 110 becomes taught, whereupon the filter guide member 100, is automatically detached from the magnets 120, and, at the same time, is stopped at the predetermined angle B from the suction inlet 11 (see FIG. 5).

When the filter guide member 100 is detached from the magnets 120, the first and the second grill brackets 80 and 81 continue to be rotated until each stopper 84 abuts the filter guide member 100, whereupon, the grill brackets 80, 81 become positioned from the suction inlet 11 at a predetermined inclination a larger than that of the angle B of the filter guide member 100.

By this, the filter guide member 100 is drawn out from the rear side of the suction grill 20 at a predetermined angle, to thereby allow the air filter 40 supported by the first and second rails 101 and 102 of the filter guide member 100 to be easily drawn in and drawn out, because it is not blocked at an upper side thereof.

Thus, the air filter 40 can be easily removed to be cleaned.

Meanwhile, when the cleaning and reinstallation of the air filter 40 is completed, the suction grill 20 is pushed at an upper side thereof toward the suction inlet 11. Then, the suction grill 20 is rotated along with the first and the second grill brackets 80 and 81 about the hinge pin 12, and the magnets 120 become adhered to an upper side of the stopped filter guide member 100 by way of the magnetic force, to thereby cause the filter guide member 100 to be coupled to the rear side of suction grill 20.

Figure 7:
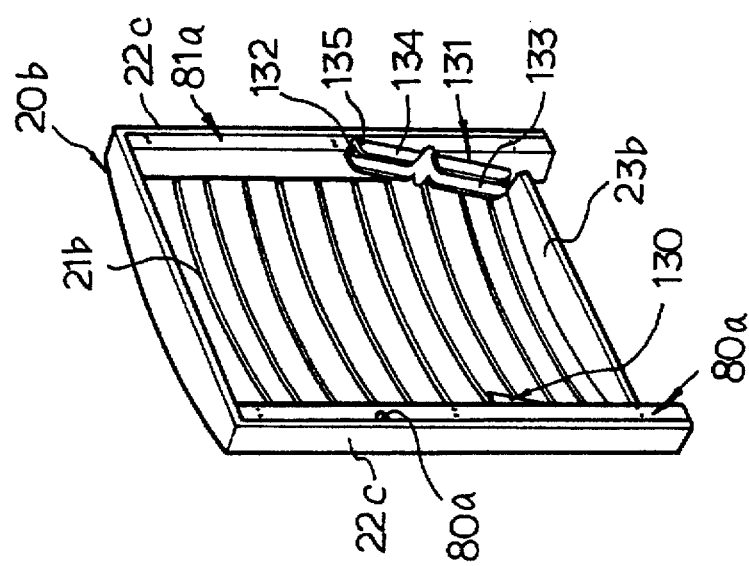
FIG. 7 is a perspective view for illustrating how the filter guide member and the grill bracket of the second embodiment are mounted to a suction grill.
Figure 6:
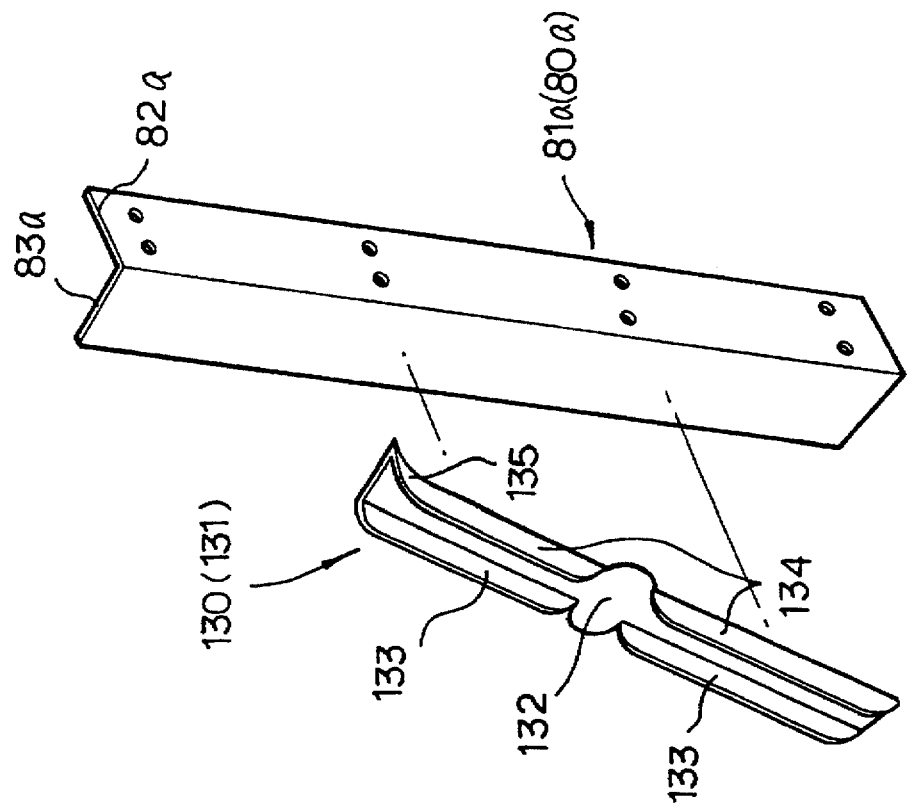
FIG. 6 is an exploded perspective view for illustrating a filter guide member and a grill bracket according to a second embodiment of the present invention.
Figure 9:
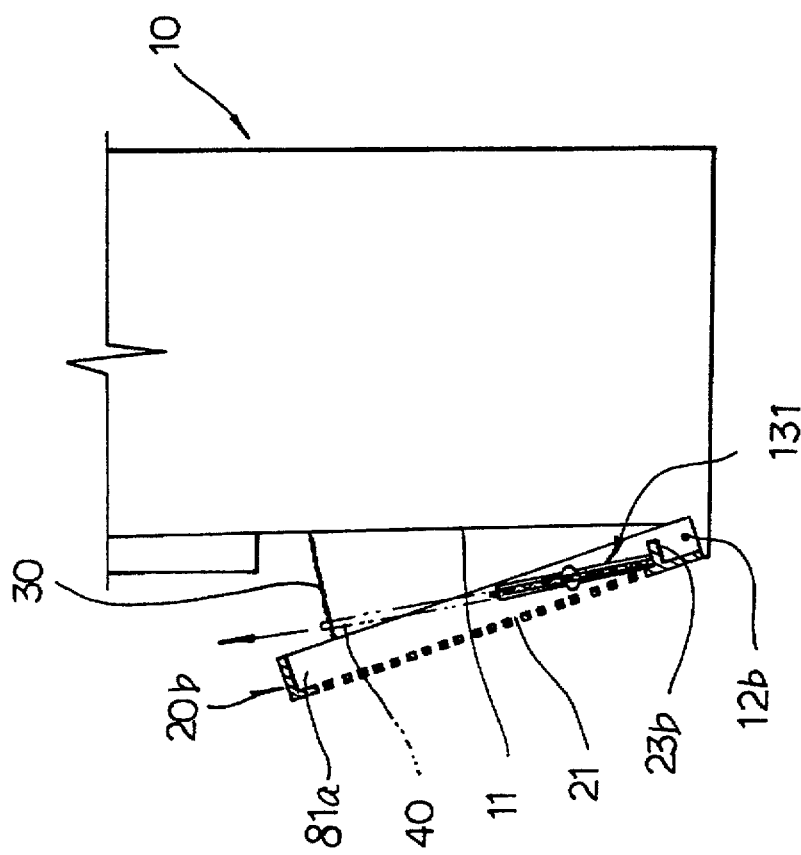
FIG. 9 is a view for illustrating an air conditioner containing an air filter attachment apparatus according to the second embodiment of the present invention.

FIGS. 6, 7, and 9 illustrate another embodiment of the present invention, wherein a suction grill 20b includes first and second grill brackets 80a and 81a (see FIG. 7).

Referring to FIG. 6, the first and second grill brackets 80a and 81a are formed in mutually facing "L"-shapes, and include a first portion 82a and a second portion 83a.

First and second filter guide members 130 and 131 include a base portion 132 for being fixedly coupled to an inner surface of the second portion 83a of the first and the second grill brackets 80a and 81a, first and second flange portions 133 and 134 respectively formed at a right angle to the base portion in order to allow left and right ends of the air filter 40 (see FIG. 9) to be drawn in and drawn out lengthwise of the fixed portion 132, and flared portion 135 so that the air filter 40 can be smoothly inserted into the guide members.

As illustrated in FIG. 7, suction grill 20b is formed with a plurality of suction holes 21b at a predetermined vertical interval, and at left and right edges thereof, there is provided a frame 22c.

Furthermore, the suction grill 20b is provided at a lower area thereof with a padding piece 23b for supporting a lower portion of the air filter 40 (see FIG. 9).

Meanwhile, the first and second filter guide members 130 and 131 are fixedly coupled to a vertical portion 83a of the first and second grill brackets 80a and 81a, as illustrated in FIGS. 6 and 7, so that a lower end portion of the first flange portion 133 can be positioned adjacent a rear surface of the suction grill 20b and an upper end portion of the first flange portion 133 can be positioned adjacent an upper end thereof.

Figure 8:
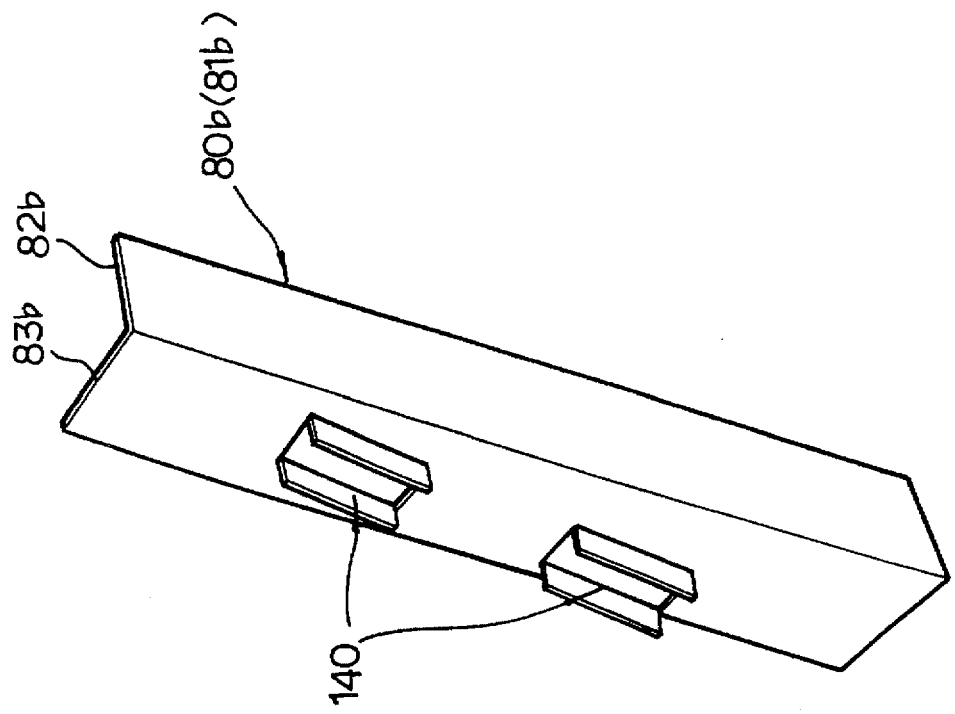
FIG. 8 is a perspective view for illustrating a modified form of the grill bracket depicted in FIG. 7.

Alternatively the first and second grill brackets 80a and 81a can be provided with "C"-shaped pairs of filter guide portions 140 (see FIG. 8) instead of the guide members 130, 131.

Now, the operational of the air filter attachment apparatus of an air conditioner according to FIGS. 6–9 will be described.

When the suction grill 20b is pulled out as illustrated in FIG. 9, in order to clean the air filter the suction grill 20b is rotated about the hinge pin 12b, thereby exposing the air filter 40.

When the connecting chain 30 connected between an upper end of the grill 20b and the suction inlet is tightened, the air filter can be easily drawn in and drawn out at an angle relative to the suction grill 20b without interference of an upper flange (not shown) formed at an upper end of suction grill 20b.

Meanwhile, as mentioned in the foregoing, when cleaning of the air filter 40 is completed and an upper side of the suction grill 20b is pushed toward the suction inlet 11, the suction grill 20b is rotated along with the first and second grill brackets 80a and 81a about the hinge pin 12b, and positioning the suction grill 20b parallel with the suction inlet 11, and at the same time, causing the same to be mutually coupled by way of locking means (not shown).

As is apparent from the foregoing, the air filter attachment apparatus of an air conditioner according to the present invention is so structured that, when a suction grill hingedly coupled to a suction inlet is pulled, an air filter is caused to be positioned at a predetermined angle relative to the suction grill through the medium of a filter guide member, so that the air filter can be drawn in and drawn out without being blocked by an element of an upper side of the suction grill e.g., an accommodation portion of a remote-controller or other attachment apparatus, for efficient removal of the filter.

The foregoing description of the preferred embodiment has been presented for the purpose of illustration and description. It is not intended to limit the scope of this invention. Many modifications and variations are possible in light of the above teaching. It should be noted that the present invention can be applied to all kinds of apparatus within the scope of the above presentation.

What is claimed:

1. In an air conditioner comprising a body for carrying heat exchange equipment and forming an air passage for conducting room air, and a filter-carrying apparatus mounted to the body for orienting a removable filter across the air passage, the filter-carrying apparatus mounted to the body for movement from a closed position to an open position for locating the filter away from the air passage and enabling the filter to be removed, the improvement wherein the filter-carrying apparatus comprises:

a grill mounted to the body for movement between a closed position adjacent the body, and an open position spaced from the body for permitting a filter to be inserted and removed, the grill forming air openings to admit air to the body, and a filter guide structure for slidably guiding a filter for insertion and removal relative to the grill along a guide path, the filter guide structure being movable away from the body along with the grill as the grill is being moved toward the open position, the filter guide path being oriented at an angle relative to a plane of the grill when the grill is in the open position, the filter guide structure being movable relative to the grill as the grill is moving to the open position.

2. The air conditioner according to claim 1 wherein the grill is pivotally mounted to the body for swinging movement to a first predetermined inclination, and the filter guide structure is pivotally movable relative to the grill and is constrained for rotation to a second predetermined inclination relative to the body, the second inclination being smaller than the first inclination.

3. The air conditioner according to claim 2 wherein each of the grill and filter guide structure is rotatable about a horizontal axis disposed adjacent a lower end thereof.

4. The air conditioner according to claim 3 wherein the horizontal axis of rotation of the grill is spaced from the horizontal axis of rotation of the filter guide structure.

5. The air conditioner according to claim 2 further including a flexible connector interconnecting the body and the filter guide structure.

6. The air conditioner according to claim 2 further including a magnet for releasably connecting the filter guide structure to the grill to pull the filter guide structure from the closed position toward the open position along with the grill.

7. The air conditioner according to claim 5 wherein the grill and filter guide structure include mutually engageable surfaces for terminating rotation of the grill when the grill reaches the first predetermined inclination.

8. The air conditioner according to claim 1 wherein the filter guide structure is rigidly mounted to the grill to form said guide path permanently at an angle relative to the plane of the grill.

* * * * *